United States Patent [19]

Eagle

[11] Patent Number: 4,592,565

[45] Date of Patent: Jun. 3, 1986

[54] APPARATUS FOR DETECTING AN OVERTURNING MOMENT IN A MOVING VEHICLE, AND JACKKNIFING IN A TRAILER-TRUCK COMBINATION

[76] Inventor: Leo Eagle, 17 Tad La., Old Bethpage, N.Y. 11804

[21] Appl. No.: 661,814

[22] Filed: Oct. 17, 1984

[51] Int. Cl.$^4$ ............................................. B62D 53/06
[52] U.S. Cl. .................................. 280/432; 180/282; 180/284; 280/755
[58] Field of Search .................. 280/432, 755, 446 R, 280/446 B; 180/282, 284, 285, 290

[56] References Cited

U.S. PATENT DOCUMENTS

| | | | |
|---|---|---|---|
| 3,398,991 | 8/1968 | Compton | 280/432 |
| 3,507,517 | 4/1970 | Eagle | 280/432 |
| 4,346,910 | 8/1982 | Beck | 280/432 |

Primary Examiner—John J. Love
Assistant Examiner—Donn McGiehan
Attorney, Agent, or Firm—Erwin S. Teltscher

[57] ABSTRACT

In an apparatus for detecting an incipient overturning moment acting on a vehicle, detection is accomplished by means of a sensing arrangement, which measures the centrifugal force to which the vehicle is subjected to, along a generally lateral direction transverse to the direction of movement of the vehicle. The sensing arrangement operates in cooperation with a force-amplifying device which, in turn, amplifies the measured force, and transmits the amplified force to the brake, and/or the acceleration pedal, and/or the steering wheel of the vehicle so as to act thereon in a sense to eliminate or at least reduce the incipient overturning moment.

10 Claims, 11 Drawing Figures

APPARATUS FOR DETECTING AN OVERTURNING MOMENT IN A MOVING VEHICLE, AND JACKKNIFING IN A TRAILER-TRUCK COMBINATION

BACKGROUND OF THE INVENTION

It is well known that the jackknifing of a tractor-trailer combination mostly takes place when an attempt is made to slow down or stop the tractor. The dynamics of each slow-down or stop changes each time, and the momentum of the tractor-trailer combination, road surface, weather, brake surfaces, distances involved and other variables are continually in flux. Due to this complexity tractor-trailer combinations are very frequently jackknifing, resulting in many serious accidents with great loss of life, maiming of many individuals, and costly material damage on the highways of the world. In particular excessive speed when turning curves is a primary cause of truck, or trailer-truck combination accidents, primarily because trucks generally have a higher center of gravity than passenger cars. Consequently when a truck, or trailer-truck combination turns a curve, particularly at high speed, the resultant centrifugal force may be sufficiently great to cause the truck to overturn, or cause jackknifing of a trailer-truck combination. It is, of course, a national objective to reduce motor-vehicle accidents of all kinds, which are statistically documented, for example, in the "Statistical Abstract of the United States, Section 22, Transportation, Land," 1982-1983 edition".

It is true that the driver of a truck can generally feel the action of the centrifugal force himself, and if he does, he would under normal circumstances slow down, so as to reduce the centrifugal force, equal to $v^2/r$, where v is the speed of the vehicle, and r is the radius of curvature of the road. Nevertheless, one has to reckon with the fact that occasionally a driver may be less than responsible, particularly if he is under the influence of any drinks or drugs. In such case it would be desirable to have an automatic override system take over, which monitors any incipient danger of the vehicle being overturned, and automatically takes corrective action.

An attempt to remedy the jacknifing of a track-trailer combination is described by Beck, U.S. Pat. No. 4,346,910. Beck uses a structure secured to the vehicle, including mechanical means, that is operative when activated to extend rigidly between the vehicle and the trailer. An activation means is secured to the vehicle and is operative to activate the mechanical means at a pre-specified condition during the operation of the vehicle. A generally similar device is also disclosed by the applicant of the present invention in U.S. Pat. No. 3,507,517. The aforesaid prior art has the disadvantage that it generally detects the aforesaid disadvantageous conditions too late, and furthermore is only applicable to a truck-trailer combination, but not to a vehicle only.

Some of the newer luxury cars are being outfitted with computer-assisted devices which have primarily been developed to sense skid, and which have a mechanism to selectively act on the brakes of the vehicle, or possibly even on the gas pedal and the steering wheel. The primary object here has been to develop an anti-skid system, with less emphasis on countering any incipient overturning moment which may manifest itself due to the aforesaid causes of both excessive vehicle speed, and a high degree of road curvature. Also systems of the prior art are generally not suited for being retrofitted to cars of an earlier vintage.

SUMMARY OF THE INVENTION

It is accordingly an object of the present invention to obviate the shortcomings of the prior art, in particular to place more emphasis for taking remedial action in the event any overturning moment acts on the vehicle, and to devise a system which is simple in operation, yet relatively low-cost, and which is suitable for being retrofitted to vehicles of an earlier vintage.

This object is attained in an apparatus for detecting an incipient overturning moment acting on a vehicle. The detection is accomplished by means of a sensing arrangement, which measures the centrifugal force to which the vehicle is subjected to along a generally lateral direction transverse to the direction of movement of the vehicle. The sensing arrangement operates in cooperation with a force-amplifying device which, in turn, amplifies the measured force, and transmits the amplified force to the brake, and/or the acceleration pedal, and/or the steering wheel of the vehicle so as to act thereon in a sense to eliminate or at least reduce the incipient overturning moment, by controlling the position thereof and thus to eliminate overturning of a vehicle, or jackknifing of a truck-trailer combination. In a preferred embodiment, reading of the angle of the tractor's front wheels from a center baseline provides an indication of the angle the tractor subtends with the trailer, and based on additional parameters, corrective action can be instituted.

BRIEF DESCRIPTION OF THE DRAWING

The invention will be better understood by means of the drawing, in which.

DESCRIPTION OF THE SPECIFIC EMBODIMENTS

Figure 1:
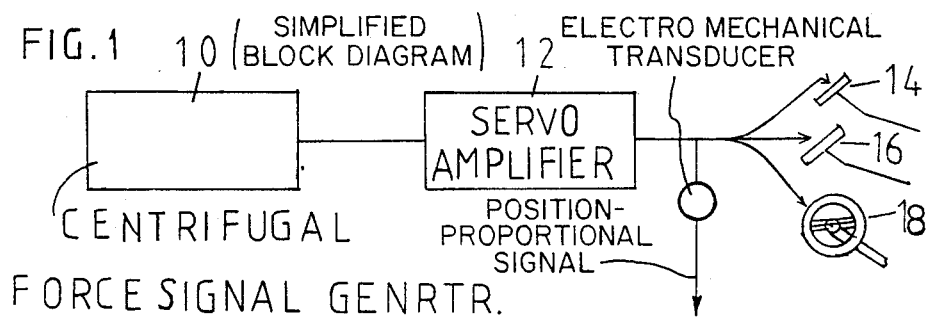
FIG. 1 is a block diagram of a most general type illustrating the basic principles, according to the present invention.

Referring now to the drawing, FIG. 1 will be seen to illustrate the general principles of the present invention. A generator of a centrifugal force pressure-indicating signal 10 has an output thereof connected to a servo amplifier 12 transmitting a position controlling force force to either the brake 14, the accelerator 16, or the steering wheel 18 of the vehicle in a sense so as to reduce any overturning moment. It will be understood that while FIG. 1 illustrates the general principles underlying the present invention, the invention may be implemented in several ways.

Figure 2:
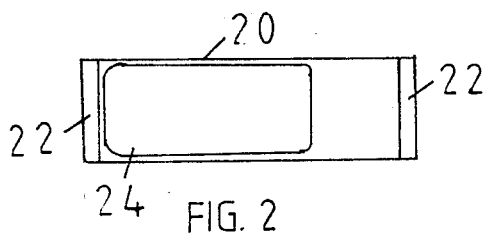
FIG. 2 is a schematic elevation view of one version of a generator of centrifugal force, according to the present invention.

The centrifugal signal generator may be implemented, for example, as shown in FIG. 2, by using a longitudinal container or tube 20, capped on each end by piezoelectric crystals 22. In one version of this embodiment of the invention, a preferably longitudinal solid element 24 is allowed to slide within the container or tube 20 along its longitudinal direction. The longitudinal container 20 will, of course, be arranged in the vehicle in such a manner that in the event a centrifugal force acts on the vehicle, the container 20 will be placed in the vehicle so as to normally extend along the direction along which the centrifugal force is expected to be exerted; this will be a direction generally transverse, or at right angles, to the direction of movement of the vehicle.

Figure 3:
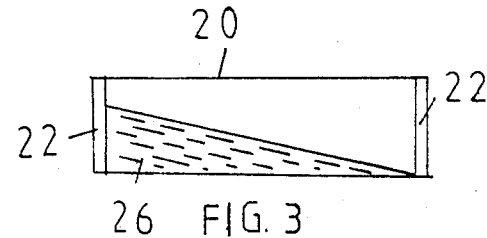
FIG. 3 is a schematic elevation view of another version of a generator of centrifugal force, according to the present invention.

In another version of the invention, shown in FIG. 3, which retains the use of a longitudinal container or tube 20, and the use of piezoelectric crystals 22 capping each end of the tube 20, a liquid 26 is used instead of the solid element 24. The liquid may be water, or possibly mercury.

Whether a solid element 24, as shown in FIG. 2, or a liquid 26, as shown in FIG. 3, is used, it will be understood that in each case a relatively small electric potential representing a pressure-indicating signal is generated by the corresponding piezoelectric element 22, on which pressure is exerted, be it by the solid element 24, or by the liquid 26. Such a potential will generally have the form of a D.C. potential, even though small variations of the potential may be superimposed on a relatively stable long-term value.

Figure 4:
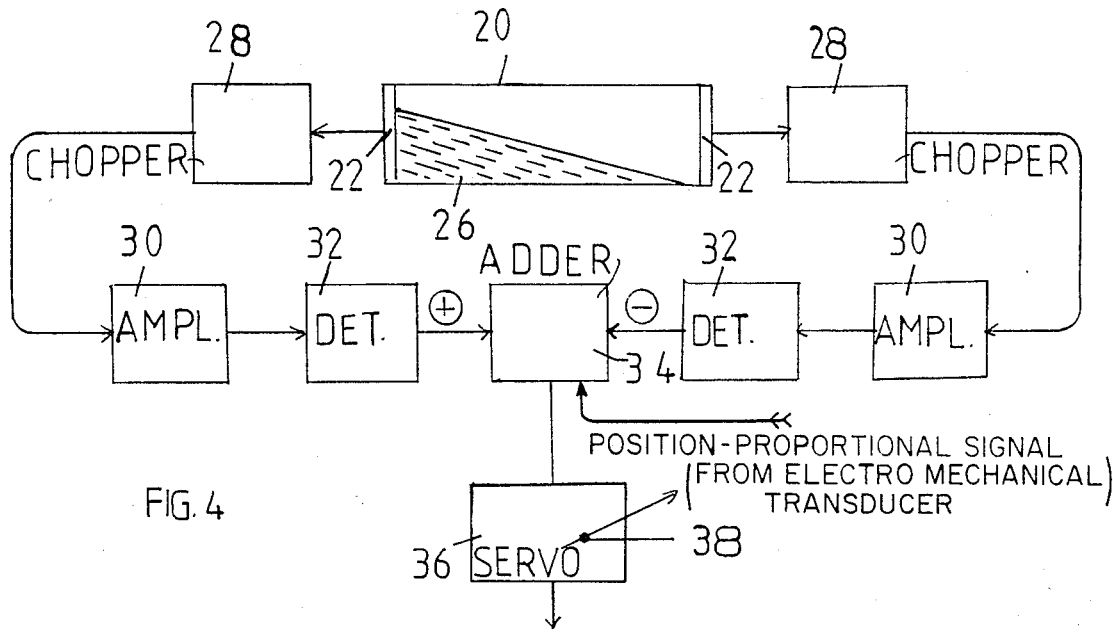
FIG. 4 is a schematic block diagram of one embodiment of my invention, using the centrifugal force generator shown in FIG. 3.

As it is difficult to faithfully amplify D.C. potentials of this type, it is preferable to convert such a D.C. potential first into an A.C. potential before further amplification. A device for achieving this method of amplification is shown in FIG. 4. Here a chopper 28 is postcoupled to each piezoelectric crystal 22; the function of the chopper 28 is to "chop" at rapid periodic intervals the D.C. voltage obtained from a corresponding piezoelectric crystal 22, thus converting the D.C. voltage into an A.C. voltage. This A.C. voltage may now be amplified without encountering any "stability" and/or "bias" problems normally encountered in D.C. amplification, and this is accomplished in an amplifier, or chain of amplifiers 30 postcoupled to each chopper 28. The amplified A.C. voltage at the output of each amplifier 30 is next rectified in a rectifier or detector 32 or 32' postcoupled to a corresponding amplifier 30.

The polarities of the rectifiers or detectors are arranged so that the detector 32 provides a positive D.C. voltage, while the detector 32' provides a negative voltage. The outputs of the detectors 32 and 32' are next summed in an adder 34. The output of the adder 34 is an error signal, which is fed to a conventional servomechanism 36, which has an adjustable loop gain control 38. The servomechanism 36 converts the output of the adder 34, which is a D.C. potential, into a position-controlling force related to the error signal, which, in turn is applied in an appropriate manner to either/or the brake 14, the accelerator pedal 16, and the steering wheel 18. It will thus be understood that the device of FIG. 2 or FIG. 3, in conjunction with the circuit block of FIG. 4, includes pressure-indicating signal to error-signal conversion means. The structure or circuit of a servomechanism, akin to that the servomechanism 36, may be obtained from any number of suitable textbooks or publications on servomechanisms, such as, for example, Servomechanisms and Regulating System Design, Vols. I and II, Harold Chestnut and Robert W. Mayer, John Wiley & Sons, Inc., New York, Techniques of System Engineering, Stanley M. Shinners, McGraw Hill Book Company, New York, Servomechanism Practice, William R. Ahrendt, McGraw Hill, New York, or Control Engineering Handbook, Editor-in-Chief John Truxal, also McGraw Hill Book Company.

The centrifugal force is known to be proportional to a factor $v^2/r$, where v is the instantaneous translational velocity of the element, such as, for example, of the vehicle, and r is the radius of curvature of the trajectory along which the element, in the present case, the vehicle travels. Thus, instead of generating the centrifugal force experienced by the vehicle and generating an error-signal signal therefrom, it is alternately possible to measure v and r separately, and to synthesize the centrifugal force from the measured parameters of v and r. The velocity v of the vehicle is already measured by the vehicle's speed indicating means, e.g. speedometer, shown schematically in FIG. 8 as 55, and it remains to generate therefrom the quantity $v^2$.

Figure 5:
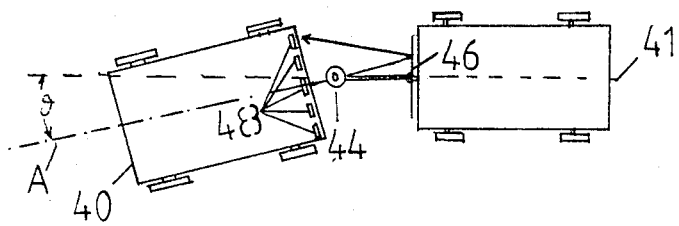
FIG. 5 is a plan view of a truck-trailer combination equipped with devices, according to the present invention, to measure the curvature of a road on which the combination travels, in particular a light source mounted on the trailer, a reflecting surface mounted on the rear of the truck, and a plurality of detectors mounted on the trailer.

One method of measuring the curvature of the road, along which the vehicle travels, is shown in FIG. 5. It is particularly applicable in the case of trailer-truck combinations. Here the longitudinal axis A of a trailer 40, which is attached or hooked on to a truck 41, will be seen to subtend an angle "delta" with the longitudinal axis A' of the truck 41. The angle delta, in turn, will be a function of the road curvature r, along which the trailer-truck combination shown travels. The larger the angle delta, the higher the curvature of the road. As a first approximation, it will therefore be possible to equate delta with 1/r. It is possible, however, for the truck or the trailer to skid on a slippery road, for example, in which the the longitudinal axis A of the trailer 40 will also subtend an angle "delta" with the longitudinal axis A' of the truck 41. In both cases the rear wheels of the truck will also subtend the angle "delta" with the direction of the wheels of the trailer, assuming that the front wheels of the truck point in a direction selected by the driver of the truck. Here the angle "delta" just denotes the angle between the axis A and the axis A', and r will be the apparent, but not actual, road curvature.

Figure 6:
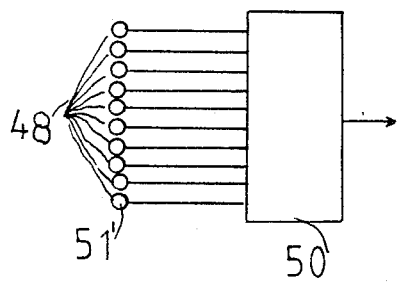
FIG. 6 is a schematic diagram of using comparators in conjunction with the embodiment of the invention shown in FIG. 5.

The angle delta may be measured, for example, by beaming a beam of light emanating from illuminating means, such as a light source 44 on the trailer directly onto the rear of the truck 41, providing a suitable reflecting surface 46 on the rear of the truck 41, reflecting the light from the reflecting surface 46 located on the rear of the truck 41 back to the trailer 40, and arranging a plurality of light detectors 48 on the trailer 40, which are spaced from one another, for example, at periodic intervals. Each detector 48, for example, may register some light impinging thereon, but the detector 48 measuring the highest light intensity will be selected to provide an indication of the angle delta. This may be accomplished, for example, as shown in FIG. 6, by providing comparator means 50, which compare, for example, sequentially, the outputs of each detector 48 with a standard light reflection value obtained from a reflector surface 51' disposed on the trailer 40 itself, which also reflects light from the light source 44. The standard light reflection value is so chosen that light reflected at an angle delta from the trailer 40 will be higher in light intensity that that obtained from the standard light reflection value, while light reflected from the trailer 40 at any other angles will have a lower intensity that that of the standard light reflection value.

Figure 7:
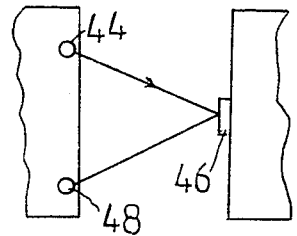
FIG. 7 is a fragmentary elevation view corresponding to that of FIG. 5.

So that the light source 44 does not interfere with the detectors 48, the light source 44 may be positioned at a higher elevation than the detectors 48, as shown, for example, in schematic form in FIG. 7.

Figure 8:
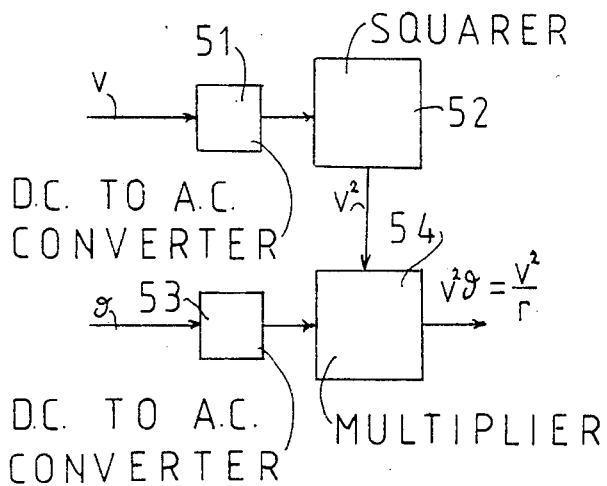
FIG. 8 is a block schematic diagram of a circuit to generate a parameter proportional to the centrifugal force applied to a vehicle, and obtained from separate measurements of its speed, and of the road curvature.

It remains to provide a squarer or multiplier circuit 52 to obtain the value $v^2$ from the value v, and to provide counting means such as a product or multiplier circuit 54, which multiples the value of $v^2$ with the value delta (in turn corresponding to the value $1/r$) so as to obtain a factor or parameter indicating signal proportional to the centrifigual force acting on the vehicle. This is then fed to parameter-indicating-signal to error-signal conversion means analagous to the pressure-indicating-signal to error-signal conversion means. This is shown in FIG. 8. If v and delta are D.C. values, it is in practice advantageous to precouple respective D.C. to A.C. converters 51 and 53 to circuits 52 and 54, respectively, and wherein the circuits 52 and 54 may, in fact, be identical circuits for economy of manufacture. Any non-linear device, such as conventional mixers, may, for example, be used as multipliers for the above-described purpose.

If it is impracticable, for one reason or another, to provide a plurality of detectors on the trailer 40, in a variant of the invention, the system can also be implemented by using only a single detector on the trailer 40. The principle behind this variant of the invention is the use of special position-indicating means disposed on the rear surface of the truck 42. In its simplest form such position-indicating means may assume the form of a (non-illustrated) horizontal strip which is black at one end, white at the other, and and which is provided with progressively lighter shades of gray from the black end towards the white end. Thus if a narrow pencil-, or blade-beam of light emanating from the trailer 40 illuminates such a strip, the intensity of even a diffuse reflection would provide an indication of the horizontal angle delta, which is subtended between the axis A of the trailer 40 and the axis A' of the truck, assuming, of course, that the intensity would be unvarying under all conditions. This assumption of an unvarying intensity of reflection is, unfortunately, not true, because any dirt, for example, which might accumulate on such a strip attached to the rear surface of the truck 41, would provide a falsified indication of the intensity of the reflected light.

It will therefore be understood that the position-indicating means employed on a rear surface of the truck 41 would have to be of such a nature, that it provides a true indication of the angle delta even in the presence of any perturbing influences, such, as for example, in the presence of any contamination or dirt which might have accumulated on the rear surface of the truck 41.

Figure 9:
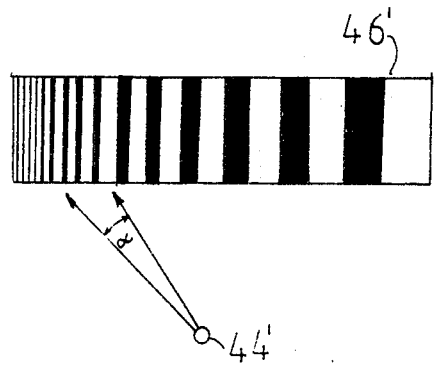
FIG. 9 is an elevation view of a particular kind of position indicating means, in the form of a strip having alternating dark and bright lines thereon.

One way of achieving this object is shown in FIG. 9, in which there is shown a strip 46' attached to the rear surface of the truck 41, on which there are painted or otherwise attached a plurality of upright and sequentially alternating light and dark strips or lines, which are relatively thin and spaced relatively close to one another near one extremity of the longitudinal strip 46', and are relatively thicker and spaced progressively further apart from one another along a path up to the other extremity of the longitudinal strip 46'.

If the illuminating means, for example, a light source 44', as shown diagramatically in FIG. 9, now emits a blade- or fan-type of light beam in the form of a substantially vertically oriented sheet, which additionally oscillates at a substantially constant rate within a relatively narrow angular range alpha, then, upon the light beam impinging on the strip 46', the ensuing diffuse reflection will be alternating light changing from bright to dark in dependence on where the light beam impinged on the strip 46'. If the light beam impinged on the strip 46' in a region thereof, where the alternating light and dark lines are bunched together relatively densely, then the light reflected from the strip 46'will be light alternating relatively rapidly from bright to dark. On the other hand, if the light beam impinged on the strip 46' in another region thereof, wherein the alternating light and dark lines or strips are spaced relatively far from one another, then the light reflected from the strip 46' will be light alternating relatively slowly from bright to dark.

Figure 10:
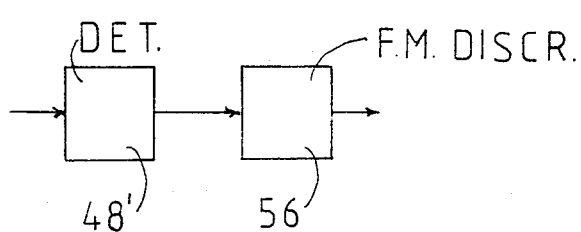
FIG. 10 is a variant of the invention shown in FIG. 5, but using only a single light detector.
Figure 11:
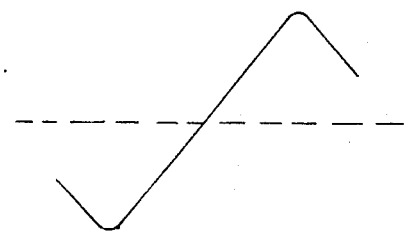
FIG. 11 is a characteristic operating curve of an FM discriminator used in the embodiment according to FIG. 10.

This fact can be made use of by postcoupling a frequency type discriminator 56 to a single detector 48' located on the trailer 40, as shown in FIG. 10. The center of the S-type shape of the discriminator detector curve shown in FIG. 11 will be adjusted to coincide with the center of the strip 46'. The output of the discriminator 56 is then coupled to a (non-illustrated) angle indicator, or can alternately be fed directly to a circuit similar to the one shown in FIG. 8, so that the output of that circuit is a parameter directly proportional to the centrifugal force acting on the vehicle. The system can be adjusted, for example, so that the range of frequencies employed is in the audio range, although, in principle, higher frequencies can also be used.

I wish it to be understood that I do not desire to be limited to the exact details of construction shown and described, for obvious modifications will occur to a person skilled in the art.

Having thus described the invention, what I claim as new and desire to be secured by Letters Patents is as follows:

1. An apparatus for detecting an incipient overturning moment in a truck-trailer combination travelling in a movement direction, said truck trailer combination being equipped with a brake pedal member, an acceleration pedal member, and a steering member, comprising in combination,
position-controlling servomechanism means,
centrifugal force measuring means for generating a pressure-indicating signal in dependence of a centrifugal force acting on said vehicle in a generally lateral direction transverse to said movement direction, including road-curvature indicating means for operatively measuring the curvature of a road travelled on by said truck-trailer combination, speed-indicating means for measuring the speed of said truck-trailer combination, said overturning moment being a function of said road curvature, and of said speed, combining means for determining from the measured road curvature, and from the measured speed a parameter indicating-signal indicative of said incipient overturning moment, and parameter indicating-signal to error signal conversion means for generating an error signal, and being arranged to transmit said error signal to said servomechanism means, said servomechanism means amplifying said error signal, and being adapted to transmit a position-controlling force to at least one of said members so as to act thereon in a sense to reduce said incipient overturning moment, whereby turning over of said vehicle is prevented.

2. The apparatus as claimed in claim 1, wherein said road curvature indicating means comprises position-indicating means disposed on the rear of said truck, having two extremities, and predetermined properties gradually varying from one characteristic near one of said extremities to another characteristic near the other of said extremities, one extremity being indicative of a straight road, the other extremity being indicative of a maximum road curvature, illuminating means located on said trailer, and positioned so as to transmit a light beam impinging onto said position-indicating means, and detecting means for detecting light reflected from said position-indicating means, said reflected light indicating a position of said beam on said position-indicating means substantially proportional to the road curvature travelled on by said truck-trailer combination.

3. The apparatus as claimed in claim 2, wherein said illuminating means is a light source emitting a light beam which is at least very narrow horizontally, wherein said position indicating means includes a mirror, and wherein said detecting means comprises a plurality of light detectors spaced at regular intervals along a row transverse to the direction of movement so that the light beam is intercepted by no more than two detectors, and further comprising comparator means for comparing the output of said light detectors, whereby the position of the light detector providing the strongest output is a measure of said road curvature.

4. The apparatus as claimed in claim 2, wherein predetermined properties include a plurality of upright and sequentially alternating light and dark strips, wherein said illuminating means is operatively oscillating along a substantially horizontal direction at a relatively high frequency compared to a rate-of-change of said road curvature, wherein said one characteristic includes said strips being spaced relatively close to one another near said one of said extremities, and being progressively spaced further apart along said position indicating means along a path up to the other of said extremities, wherein said other characteristic includes said strips being spaced relatively relatively far from one one another, and whereby said detecting means provide an oscillating output having an average high frequency substantially proportional to the distance between said one of said extremities, and said position of said beam on said position indicating means, said position being defined by an impingement center of oscillations of said beam occurring on said position-indicating means.

5. The apparatus as claimed in claim 4, further comprising a frequency discriminator postcoupled to said detecting means, so that the output of said frequency discriminator provides a measure of said road curvature.

6. The apparatus as claimed in claim 1, wherein said pressure-to-electrical signal transducer includes an A.C. amplifier connected to said conversion means, and a rectifier converting an A.C. output of said amplifier into D.C. for feeding the input of said servomechanism.

7. An apparatus for detecting an incipient overturning moment in a vehicle travelling in a movement direction, said vehicle being equipped with a brake pedal member, an acceleration pedal member, and a steering member, comprising in combination, position-controlling servomechanism means, centrifugal force measuring means, including a pressure-to-electrical signal transducer for generating a pressure-indicating signal in dependence of a centrifugal force acting on said vehicle in a generally lateral direction transverse to said movement direction, pressure-indicating-signal to error-signal conversion means coupled to an output of said pressure-to-electrical signal transducer, and providing an error signal at its output, said servomechanism means accepting and amplifying said error signal, and being adapted to transmit a position-controlling force related to said error signal to at least one of said members, so as to act thereon in a sense to reduce said incipient overturning moment, whereby turning over of said vehicle is prevented.

8. The apparatus as claimed in claim 7, wherein said centrifugal force measuring means comprises a normally horizontally disposed longitudinal container, positioned in a plane of said movement direction with its longitudinal direction approximately at right angles to said movement direction, and along a direction along which the centrifugal force is expected to be exerted, said container having two end regions, pressure-exerting means movable in said container along said longitudinal direction, and being capable of exerting a pressure on one of said end regions in dependence of, said centrifugal force, and pressure to pressure-indicating signal conversion means disposed in each end region, generating said pressure-indicating signal, and being arranged to transmit said pressure-indicating signal to said pressure-indicating-signal to error-signal conversion means.

9. The apparatus as claimed in claim 8, wherein said pressure-exerting means is a liquid.

10. The apparatus as claimed in claim 8, wherein said pressure-exerting means is solid member.

* * * * *